United States Patent [19]

Anderson et al.

[11] 4,178,882
[45] Dec. 18, 1979

[54] HYDROGEN FUEL SUPPLY SYSTEM

[75] Inventors: Vaughn R. Anderson; Ronald L. Woolley; Edward H. Davis, all of Orem, Utah

[73] Assignee: Billings Energy Corporation, Provo, Utah

[21] Appl. No.: 871,094

[22] Filed: Jan. 20, 1978

[51] Int. Cl.² .............................................. F02B 43/10
[52] U.S. Cl. ...................... 123/1 A; 123/3; 123/DIG. 12
[58] Field of Search ............... 123/DIG. 12, 1 A, 3, 123/119 E, 136; 137/119

[56] References Cited

U.S. PATENT DOCUMENTS

| 2,226,810 | 12/1940 | Ensign et al. | 137/119 |
| 3,834,359 | 9/1974 | Ando | 123/1 A |
| 4,016,836 | 4/1977 | MacKay et al. | 123/3 |

Primary Examiner—Charles J. Myhre
Assistant Examiner—Craig R. Feinberg
Attorney, Agent, or Firm—Criddle, Thorpe & Western

[57] ABSTRACT

A fuel supply system is provided for engines which are adapted to operate on gaseous hydrogen fuel and which utilize a fuel tank containing a metal hydride for the storage of hydrogen. The system provides for high pressure operation when the hydride in the fuel tank is fully charged with hydrogen, as well as for operation at low pressures to allow maximum utilization of the hydrogen stored in the hydride. A supply conduit, which can supply the hydrogen needed during normal operation of the engine with minimal pressure drop, connects the storage tank to the fuel intake of the engine. A bypass conduit is provided having one end thereof connected to the supply conduit and its other end reconnected to the supply conduit downstream of the first connection. Valve means are adapted to direct the flow of hydrogen either directly through the supply conduit or to divert the flow of hydrogen from the supply conduit through the bypass conduit and back to the supply conduit downstream from the valve means. A pressure regulator is included in the bypass conduit which is capable of regulating downstream pressure at a preset pressure when the upstream pressure is greater than the preset pressure. A controller monitors the downstream pressure and when the monitored pressure falls sufficiently below the preset pressure of the regulator, the controller changes the valve means so that the hydrogen flows directly through the supply conduit. Thus, when the storage tank supplies high pressure hydrogen to the supply conduit, the hydrogen is routed through pressure regulating means in the bypass conduit, and when the pressure from the storage tank decreases below the regulated pressure, the hydrogen is routed through the supply conduit thereby avoiding substantial pressure drops as it flows from the storage tank to the engine.

8 Claims, 1 Drawing Figure

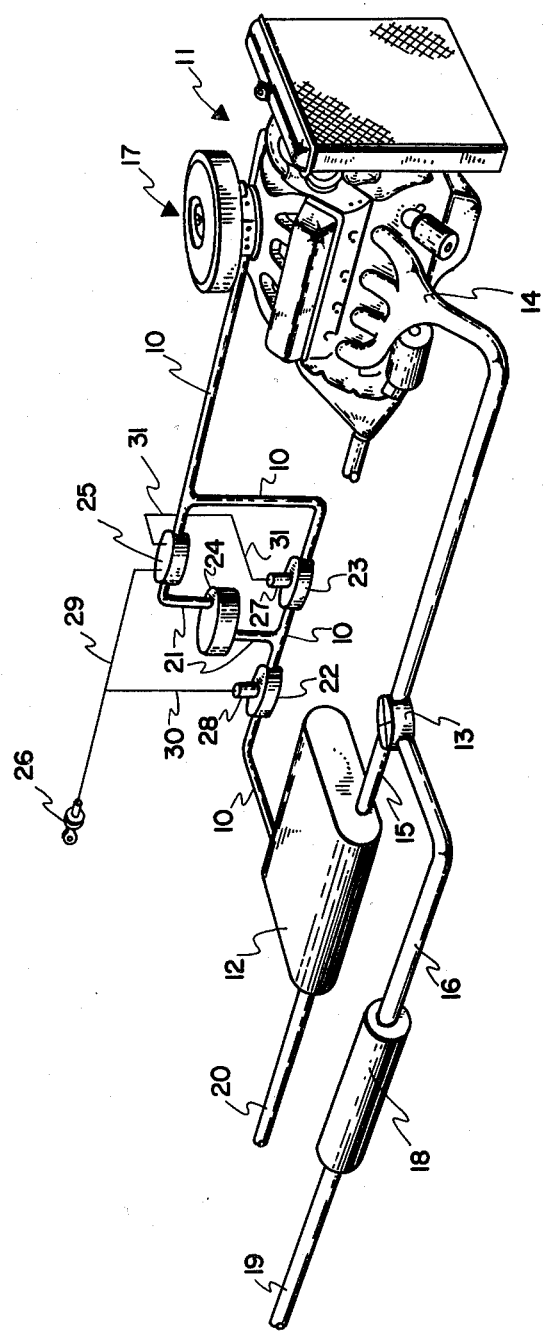

HYDROGEN FUEL SUPPLY SYSTEM

BACKGROUND OF THE INVENTION

1. Field

The invention relates to internal combustion engines which are designed to operate on gaseous hydrogen fuel and which utilize a fuel tank containing a metal hydride for the storage of hydrogen. In particular, the invention relates to a fuel system for conveying the fuel from the storage tanks to the engine.

2. State of the Art

Internal combustion engines utilizing hydrogen fuel have been shown to be both feasible and an attractive alternative to engines which utilize gasoline. See, for example, U.S. Pat. No. 3,983,882 issued on Oct. 5, 1976 to Roger E. Billings, as well as the references cited therein. The storage of hydrogen for use in internal combustion engines has presented difficult problems. However, the use of storage containers containing metal hydrides has mitigated many of those problems. See, for example, U.S. Pat. No. 4,016,836 issued on Apr. 12, 1977 to Donald B. MacKay et al.

The hydride-containing containers are typically charged with hydrogen at a pressure of about 500 psig or greater. This pressure must be regulated when the stored hydrogen is fed to the mixing device on the engine which mixes the hydrogen with air and introduces the mixture to the intake manifold of the engine. Regulators have been used in prior hydrogen fuel systems, wherein the regulator regulates the hydrogen pressure downstream therefrom at a present pressure. As the hydrogen is used from the hydride-containing storage tanks, the pressure of the hydrogen released by the hydride is continuously reduced. At a point wherein the pressure of the hydrogen coming from the storage tanks is less than the preset pressure at which the regulator is set, the regulator becomes ineffective, and the pressure downstream therefrom is the pressure of the hydrogen coming from the storage tanks less the pressure drop incurred in passing through the flow conduits and the pressure regulator. Because of the relatively large pressure drop incurred, the hydride-storage tanks required recharging when the pressure therein fell to about 100 to 150 psig. Considerable hydrogen is still contained in the storage tanks at that pressure but is unavailable because of the pressure drop incurred in delivering the hydrogen to the engine.

3. Objective:

The principal objective of the present invention was to provide a hydrogen fuel supply system in which nearly all the hydrogen stored in the storage tank before the tank has to be recharged.

SUMMARY OF THE INVENTION

The foregoing objective was achieved in accordance with this invention by providing a hydrogen fuel supply system which is effective in delivering sufficient hydrogen to the engine to permit normal operation thereof with storage tank pressures as low as about 5 psig by minimizing the pressure drop incurred in transferring the hydrogen from the storage tank to the feed means for feeding gaseous hydrogen to the intake manifold of the engine, i.e., the mixing device which mixes the hydrogen with air and introduces the mixture to the intake manifold.

The fuel system of this invention comprises, in combination with an internal combustion engine having feed means for feeding gaseous hydrogen to the intake manifold thereof, a fuel tank containing a metal hydride which is capable of reacting with and absorbing hydrogen at a given temperature and pressure, and of releasing hydrogen gas at a temperature higher than the given temperature and/or a pressure lower than the given pressure. A supply conduit is connected between the fuel tank and the feed means to the intake manifold of the engine for flow of gaseous hydrogen from the fuel tank to the feed means. A bypass conduit has one end connected to the supply conduit at some point between the tank and the feed means, with the other end of the bypass conduit being reconnected to the supply conduit downstream from the first connection. A pressure regulator is provided in conjunction with the bypass conduit. The pressure regulator is adapted to regulate the pressure downstream thereof at a preset value when the upstream pressure is greater than the preset value, and of allowing the downstream pressure to decrease below the preset value when the upstream pressure is below the preset value.

Valve means are provided in combination with the supply conduit and the bypass conduit. The valve means are adapted to either direct the flow of hydrogen gas directly through the supply conduit or to divert the flow of hydrogen gas from the supply conduit through the bypass conduit and back to the supply conduit downstream from the valve means. During the majority of an operation cycle of a fully charged storage tank, hydrogen is discharged from the tank at relatively high pressures, i.e., from about 150 to 500 psig. During this period, the valve means are controlled so as to divert the flow of hydrogen through the bypass conduit and the pressure regulator which regulates the downstream pressure of the hydrogen to a value no greater than can adequately be handled by the downstream apparatus, principally the feed means which introduces the hydrogen to the intake manifold of the engine. When the upstream pressure, i.e., the pressure of the hydrogen coming from the storage tank, declines to a level which is inadequate to supply a full flow of hydrogen because of the pressure drop through the bypass conduit and pressure regulator, the valve means are controlled so as to direct the flow of hydrogen gas directly through the low-pressure-drop supply conduit and thus avoid the bypass conduit and its associated high pressure drop requirements. By avoiding the high pressure drop, an adequate flow of hydrogen can be supplied to the engine even when the pressure of the hydrogen coming from the storage tank has declined to around 5 psig.

A pressure actuated controller is adapted to monitor the pressure of the hydrogen in the bypass conduit or supply conduit downstream from the regulator and controls the valve means in accordance with the monitored pressure. The pressure at which the controller charges the valve means for flow of hydrogen directly through the supply conduit and avoid the bypass conduit can be set at any preset level which is no greater than the preset pressure of the regulator but still large enough that full flow of hydrogen can be delivered through the bypass conduit at that pressure. It has been found advantageous to set the control pressure of the controller at between about 50 to 100 psig.

Preferably, means are also provided in combination with the controller whereby the valve means can be closed thereby preventing hydrogen gas flow through either the supply conduit or bypass conduit. This permits charging of the storage tanks at high pressure without subjecting the downstream supply conduit, the bypass conduit, and the feed means on the engine to such high pressure.

THE DRAWING

A particular embodiment of the present invention representing the best mode presently contemplated of carrying out the invention is illustrated in the accompanying drawing consisting of a single figure showing a hydrogen fuel supply system for use with an internal combustion engine of a motor vehicle.

DETAILED DESCRIPTION OF THE ILLUSTRATED EMBODIMENT

In accordance with the present invention, a hydrogen supply system is provided in combination with an internal combustion engine. In the drawing, an engine 11 of a motor vehicle is shown. A fuel supply conduit 10 connects the storage tank 12 with a carburetor 17 which is adapted to receive gaseous hydrogen from the conduit 10 and to mix the hydrogen gas with air for introduction to the intake manifold of the engine 11. Exemplary carburetors suitable for use with internal combustion engines are disclosed in U.S. Pat. No. 3,983,882, issued to Roger E. Billings on Oct. 5, 1976.

The storage tank 12 contains a metal material which is capable of reacting with and absorbing hydrogen at a given temperature and pressure in the form of a metal hydride, and the metal hydride is capable of dissociating and thereby releasing hydrogen when by raising the temperature above the given temperature at which the hydrogen was absorbed and/or reducing the given pressure at which the hydrogen was absorbed. Exemplary metal materials which can be utilized include iron, titanium, nickel, calcium, magnesium, manganese, rare earth elements, and mixtures and alloys thereof. Alloys which are particularly advantageous include iron-titanium, lanthanum-nickel, calcium-nickel, mischmetal-nickel, manganese-nickel, and mischmetal-calcium-nickel alloys. The storage tank 12 is adapted to hold the metal material therein and to enable the circulation of a heat exchange medium in proximity with the metal material. Exemplary storage tank configurations are shown in U.S. Pat. No. 4,016,836, issued to Donald B. MacKay et al. on Apr. 12, 1977. As shown in the drawing the exhaust manifold 14 is coupled by way of a bidirectional valve 13 to a conduit 15 to the tank 12, and to an exhaust pipe 16 leading to a muffler 18 and another section of exhaust pipe 19. The valve 13 is adapted to direct exhaust gases from the manifold 14 either through conduit 15 to the storage tank 12, or to pipe 16 for discharge into the atmosphere, or to both. The exhaust gases introduced into tank 12 through conduit 15 are exhausted therefrom through pipe 20. The operation of valve 13 and the exhaust system are fully described in the above-mentioned MacKay et al. Patent.

The hydrogen supply conduit 10 provides direct flow of gaseous hydrogen from tank 12 to carburetor 17 during certain stages of the operation of tank 12 as will be explained further hereinbelow. A bypass conduit 21 is connected at one of its ends (the upstream end) to the supply conduit 10 at a point between the tank 12 and carburetor 17, with its other end (downstream end) reconnected to the supply conduit 10 downstream from the first connection.

Valve means are provided in combination with supply conduit 10 and bypass conduit 21 so as to either direct the flow of hydrogen gas directly through the supply conduit 10 or to divert the flow of hydrogen gas from the supply conduit 10 through the bypass conduit 21 and back to the supply conduit 10 downstream from the valve means. As shown in the drawing, the valve means comprises first and second valves 22 and 23 in spaced relationship, with the first valve 22 being upstream from the first connection of the bypass conduit 21, and the second valve is located in the portion of the supply conduit 10 between the connections of the bypass conduit 21. When valve 23 is closed and valve 22 is open, the flow of hydrogen is directed through the bypass conduit 21. When both valves 22 and 23 are open, the flow of hydrogen is directed through conduit 10 directly to the carburetor 17.

A pressure regulator 24 is provided in combination with bypass conduit 21 and is capable of regulating the pressure downstream thereof at a preset value when the pressure upstream thereof is greater than the preset value, and of allowing the downstream pressure to decrease below the preset value when the pressure upstream is below the preset value. Thus, when hydrogen is obtained from the storage tank 12 at pressures above the preset value, say 150 psig, the regulator maintains a pressure of 150 psig, the preset value, in the downstream portion of conduits 21 and 10. As the pressure of the hydrogen coming from tank 12 drops to less than 150 psig, the regulator 24 allows hydrogen flow therethrough with a downstream pressure considerably less than the preset value or of the upstream pressure.

A pressure actuated controller is adapted to monitor the pressure downstream of the regulator 24 and to control the operation of the valve means and thereby the direction of flow of hydrogen through the system. As illustrated, the controller 25 is positioned in the downstream portion of bypass conduit 21 prior to the reconnection of that conduit with the supply conduit 10. The controller 25 is supplied with a source of electrical current, such as from a remote switch 26. The switch 26 is advantageously the ignition switch for the engine and is adapted to supply an electrical current to controller 25 when the ignition switch is in any position except the off position. The controller 25 is advantageously a pressure activated switch which is closed at a selected pressure which is less than the preset value of regulator 24. The selected pressure for controller 25 can be in the range of from about 20 to 100 psig, preferably from about 50 to 100 psig. When the switch of controller 25 closes, electrical current is provided to a solenoid 27 on valve 23. When the solenoid 27 is energized, it opens valve 23. Otherwise, valve 23 is adapted to close automatically under spring force whenever the solenoid 27 is not energized. Thus, when the pressure downstream of controller 25 is above the set pressure thereof, no current is supplied to solenoid 27 and valve 23 remains closed, so that hydrogen gas is directed through bypass conduit 21. But, when the downstream pressure falls below the set pressure of controller 25, an electrical current is supplied to solenoid 27 and valve 23 opens, so that hydrogen gas can pass directly through conduit 10 to carburetor 17. The pressure drop through conduit 10 is designed to be minimal and significantly less than the pressure drop incurred through the regulator 24. Thus, by avoiding the higher pressure drops associated with a system containing a pressure regulator, a significantly larger amount of hydrogen can be withdrawn from the storage tank 12 in sufficient amount to operate the engine 11 before refilling of tank 12 is required. In addition, a much lower grade metal material can be utilized in the tank 12. The lower grade material still contains significant amounts of hydrogen at low pressures, and this hydrogen can be utilized with the supply system of this invention.

The valve 22 is provided to primarily protect the fuel supply system downstream thereof from high pressures which are used in recharging or refilling of the tank 12. Valve 22 is similar to valve 23 in that it is operated by a solenoid 28 and it is adapted to close automatically under spring force when the solenoid 28 is not energized. The solenoid 28 is provided with a source of electrical current by a remote switch, preferably the ignition switch 26 of the engine. When the ignition switch is in the off position, valve 22 is closed, and when the ignition switch is turned on, the solenoid 28 is energized and valve 22 is opened.

As illustrated, the ignition switch 26 is connected by electrical circuits 29 and 30 to controller 25 and solenoid 28, respectively. The controller 25 is in turn in electrical connection with solenoid 27 through circuit 31. The system could be modified by replacing valves 22 and 23 with a single 3-way valve at the upstream connection of the bypass conduit 21 to supply conduit 10. The 3-way valve would be of the type which are spring based in a closed position when the solenoids associated therewith are not energized. The controller 25 would energize the solenoid opening the valve to the bypass conduit 21 when the pressure of gas coming from the tank 12 was sufficient that the pressure downstream of the regulator 24 was greater than the set pressure of the controller. When the pressure downstream of the regulator falls to a value less than the set pressure, the controller would energize the solenoid so that valve would open to the supply conduit 10. Other modifications could be made and other embodiments constructed without departing from the novel inventive concepts set forth herein and in the claims which follow.

We claim:

1. A hydrogen fuel supply system in combination with an internal combustion engine having feed means for feeding gaseous hydrogen to the intake manifold thereof, said fuel system comprising:
    a fuel tank containing a metal hydride which is capable of reacting with and adsorbing hydrogen at a given temperature and pressure, and of releasing hydrogen gas at least under one of the conditions of a temperature higher than said given temperature or a pressure lower than said given pressure;
    a supply conduit connected between said fuel tank and said feed means of said engine for flow of gaseous hydrogen from said fuel tank to said feed means;
    a bypass conduit having one end thereof connected to the supply conduit at a point between said tank and said feed means, and having its other end connected to the supply conduit downstream from the connection of said one end to said supply conduit;
    a pressure regulator in combination with said bypass conduit, said pressure regulator being capable of regulating the pressure downstream thereof at a preset value when the pressure upstream thereof is greater than the preset value and of allowing the pressure downstream to decrease below the preset value when the pressure upstream is below the preset value;
    valve means in combination with the supply conduit and the bypass conduit, said valve means being adapted to either direct the flow of hydrogen gas directly through the supply conduit or to divert the flow of hydrogen gas from the supply conduit through the bypass conduit and back to the supply conduit downstream from the valve means;
    a pressure actuated controller adapted to monitor the pressure downstream from said regulator, said controller also being adapted to control said valve means so that hydrogen flows through the bypass conduit when the monitored pressure is greater than a second preset pressure of said regulator, and said controller also being adapted to control said valve means so that hydrogen flows directly through the supply conduit when the monitored pressure is less than said second preset pressure.

2. A hydrogen fuel supply system in accordance with claim 1, wherein said valve means can also be closed thereby preventing hydrogen gas flow through either the supply conduit or the bypass conduit, and means are provided in combination with said controller for closing said valve means.

3. A hydrogen fuel supply system in accordance with claim 2, wherein the means for closing said valve means comprises a remote switch which when moved to its off position terminates the operation of the controller, and the valve means is provided with means for returning to its normally closed position when the operation of the controller is terminated.

4. A hydrogen fuel supply system in accordance with claim 3, wherein the controller is rendered operational by providing an electric current thereto, and the switch is the ignition switch on the internal combustion engine, said ignition switch being connected to said controller through an electrical circuit so that when the ignition switch is in any position other than off, electrical current is supplied to the controller.

5. A hydrogen fuel supply system in accordance with claim 4, wherein the valve means is provided with at least one solenoid which is adapted to operate the valve means when supplied with an electrical current, and the controller is a pressure activated switch which is adapted to close and thereby allow electrical current to pass to the solenoid when the monitored pressure is less than said second preset measure, with said pressure activating switch being open, thereby preventing current flow to the solenoid when the monitored pressure is greater than the second preset pressure.

6. A hydrogen fuel supply system in accordance with claim 1, wherein the valve means comprises first and second valves positioned in spaced relationship in the supply conduit, with the first valve being upstream from said one end of the bypass conduit and the second valve being positioned in the portion of the supply conduit between the connections of the bypass conduit;
    said controller is adapted to maintain the second valve closed when the monitored pressure is greater than said second preset pressure, and to maintain the second valve open when the monitored pressure is less than said second preset pressure; and
    said switch means is adapted to maintain the first valve open when the switch means is in the on position and to maintain the first valve closed when the switch means is in the off position.

7. A hydrogen fuel supply system in accordance with claim 6, wherein each of said first and second valves has a solenoid in combination therewith which is adapted to open its respective valve when it is supplied with an electrical current, with said valves being adapted to automatically return to their closed position when the current to the respective solenoids is discontinued;

said controller comprises a pressure activated switch which is adapted to close and thereby allow electrical current to pass to the solenoid on the second valve when the monitored pressure is less than said second preset pressure, said pressure activating switch being open, thereby preventing current flow to the solenoid when the monitored pressure is greater than the second preset pressure; and said switch completing an electrical circuit which provides current to said pressure activated switch when the switch means is in the on position and breaks the circuit when in the off position.

8. A hydrogen fuel supply system in accordance with claim 6, wherein the switch is incorporated into the ignition switch of the engine.

* * * * *